(12) United States Patent
Maeda et al.

(10) Patent No.: US 10,738,862 B2
(45) Date of Patent: Aug. 11, 2020

(54) CHAIN GUIDE MECHANISM

(71) Applicants: TSUBAKIMOTO CHAIN CO., Osaka-shi, Osaka (JP); TSUBAKI DEUTSCHLAND GMBH, Schwaig (DE)

(72) Inventors: Munehiro Maeda, Osaka (JP); Stefan Belmer, Schwaig (DE); Meher Hafdallaoui, Schwaig (DE)

(73) Assignees: TSUBAKIMOTO CHAIN CO., Osaka-shi (JP); TSUBAKI DEUTSCHLAND GmbH, Schwaig (DE)

( * ) Notice: Subject to any disclaimer, the term of this patent is extended or adjusted under 35 U.S.C. 154(b) by 311 days.

(21) Appl. No.: 15/944,012

(22) Filed: Apr. 3, 2018

(65) Prior Publication Data

US 2018/0291987 A1    Oct. 11, 2018

(30) Foreign Application Priority Data

Apr. 7, 2017   (JP) .................................. 2017-076881

(51) Int. Cl.
*F16H 7/18* (2006.01)
*F16H 7/08* (2006.01)

(52) U.S. Cl.
CPC .................. *F16H 7/18* (2013.01); *F16H 7/08* (2013.01); *F16H 2007/087* (2013.01); *F16H 2007/0872* (2013.01); *F16H 2007/0874* (2013.01)

(58) Field of Classification Search
CPC ............... F16H 2007/0874; F16H 7/08; F16H 2007/0804; F16H 2007/0806; F16H 2007/0853

USPC .................................................. 474/140, 111
See application file for complete search history.

(56) References Cited

U.S. PATENT DOCUMENTS

| 2,210,276 | A | * | 8/1940 | Bremer | F16H 7/0848 474/110 |
| 6,068,567 | A | * | 5/2000 | Thompson | F16H 7/08 474/101 |
| 6,238,311 | B1 | * | 5/2001 | Cutting | F16H 7/08 474/109 |
| 6,322,469 | B1 | * | 11/2001 | Markley | F16H 7/1236 474/110 |
| 6,322,470 | B1 | * | 11/2001 | Markley | F16H 7/08 474/111 |

(Continued)

FOREIGN PATENT DOCUMENTS

| JP | 3932613 B2 | 6/2007 |
| JP | 2010-084775 A | 4/2010 |
| JP | 2011-099469 A | 5/2011 |

*Primary Examiner* — Henry Y Liu
(74) *Attorney, Agent, or Firm* — Westerman, Hattori, Daniels & Adrian, LLP

(57) ABSTRACT

To provide a chain guide mechanism that enables a plurality of chain guides, a chain, and a sprocket to be held together with a simple structure, such that work efficiency during assembly and maintenance is improved. The chain guide mechanism joins a plurality of chain guides that slidably guide a chain; and a connection unit is made up of arm members that extend from both sides of the chain on a chain running surface of a fixed chain guide toward a pivoting chain guide, and a coupling member including a fitting hole for a mounting boss of the pivoting chain guide to fit in.

6 Claims, 7 Drawing Sheets

(56) References Cited

U.S. PATENT DOCUMENTS

| | | | |
|---|---|---|---|
| 6,358,169 B1 * | 3/2002 | Markley | F02B 67/06 474/111 |
| 6,849,015 B2 * | 2/2005 | Markley | F16H 7/0848 474/109 |
| 6,955,622 B2 * | 10/2005 | Bachmair | F01L 1/02 254/100 |
| 7,097,579 B2 * | 8/2006 | Markley | F16H 7/08 474/101 |
| 7,390,276 B2 * | 6/2008 | Tryphonos | F01L 1/024 474/109 |
| 7,455,606 B2 * | 11/2008 | Markley | F16H 7/0848 474/109 |
| 7,476,168 B2 * | 1/2009 | Markley | F16H 7/0829 474/111 |
| 7,479,077 B2 * | 1/2009 | Markley | F16H 7/08 474/101 |
| 7,513,843 B2 * | 4/2009 | Markley | F16H 7/0848 474/111 |
| 7,537,533 B2 * | 5/2009 | Wigsten | F16H 7/08 474/101 |
| 7,628,719 B2 * | 12/2009 | Markley | F16H 7/0848 474/111 |
| 7,632,200 B2 * | 12/2009 | Markley | F16H 7/0848 474/109 |
| 7,901,309 B2 * | 3/2011 | Lehtovaara | F16H 7/08 474/109 |
| 8,025,599 B2 * | 9/2011 | Chekansky | F16H 7/0848 474/109 |
| 8,066,600 B2 * | 11/2011 | Wigsten | F16H 7/0848 474/111 |
| 8,387,244 B2 * | 3/2013 | Markley | F01L 1/022 123/90.31 |
| 8,454,462 B2 * | 6/2013 | Konno | F16H 7/08 474/111 |
| 8,465,385 B2 * | 6/2013 | Konno | F16H 7/08 474/101 |
| 8,550,943 B2 * | 10/2013 | Kroon | F01L 1/02 474/111 |
| 8,579,746 B2 * | 11/2013 | Mori | F16H 7/06 474/140 |
| 8,608,601 B2 * | 12/2013 | Kim | F16H 7/08 474/101 |
| 8,672,785 B2 * | 3/2014 | Young | F16H 7/08 474/111 |
| 8,979,684 B2 * | 3/2015 | Markley | F16H 7/0831 474/111 |
| 9,080,640 B2 * | 7/2015 | Markley | F16H 7/08 |
| 9,188,202 B2 * | 11/2015 | Markley | F16H 7/08 |
| 2006/0270502 A1 * | 11/2006 | Markley | F16H 7/08 474/111 |
| 2006/0293134 A1 * | 12/2006 | Markley | F16H 7/08 474/111 |
| 2010/0248876 A1 * | 9/2010 | Kroon | F01L 1/02 474/111 |
| 2011/0105258 A1 * | 5/2011 | Konno | F16H 7/08 474/111 |
| 2011/0183797 A1 * | 7/2011 | Konno | F16H 7/08 474/111 |
| 2011/0201465 A1 * | 8/2011 | Kim | F16H 7/08 474/111 |
| 2011/0251002 A1 * | 10/2011 | Mori | F16H 7/06 474/140 |

* cited by examiner

CHAIN GUIDE MECHANISM

BACKGROUND OF THE INVENTION

1. Field of the Invention

The present invention relates to made up of a fixed guide that slidably guides a chain, a pivoting lever guide that slidably guides the chain, and a connection unit that connects the fixed guide and the pivoting lever guide, specifically to a chain guide mechanism that is suited, for example, to an engine timing system where chain guides maintain the tension of, and slidably guide, an endless chain such as a silent chain or roller chain passed over sprockets respectively provided to a crankshaft and cam shafts inside an engine room.

2. Description of the Related Art

In conventionally known engine timing systems, an endless chain C is passed over a drive sprocket S1 and a pair of driven sprockets S2 and S3 respectively attached to a crank shaft and cam shafts inside an engine room as shown in FIG. 8. A chain guide mechanism is configured with a pivoting chain guide 520 that guides the chain while maintaining appropriate tension by pressing the chain C with a tensioner T, and a fixed chain guide 530 that guides the running chain C.

One problem with this chain guide mechanism was poor work efficiency during assembly or maintenance since the pivoting chain guide 520 is pivotally mounted in the engine room (not shown) with a mounting shaft B while the fixed chain guide 530 is fixed to the engine room with mounting shafts B1 and B2, which means that the drive sprocket S1, driven sprockets S2 and S3, pivoting chain guide 520, and fixed chain guide 530 had to be individually assembled or disassembled, and the chain C had to be separately passed over the sprockets or removed therefrom.

Timing systems that adopt a chain guide mechanism in which a pivoting chain guide and a fixed chain guide are connected and held together such that work efficiency during assembly or maintenance is improved to lessen such a problem have been known.

The chain guide mechanism 600 of one such known timing system has a fixed chain guide 630 integrally formed with an arm member 611 to configure a connection unit as shown in FIG. 9. A fitting hole 612 at a distal end of the arm member 611 is fitted with a mounting boss 621, which is the pivot point of the pivoting chain guide 620 so that the two components are integrally held.

The arm member 611 in the chain guide mechanism 600 of this known timing system is formed in a shape that defines the relative positions of the drive sprocket S1, driven sprockets S2 and S3, and pivoting chain guide 620 so that they are temporarily assembled before the actual assembling and need not be positioned relative to each other during assembly or maintenance (see, for example, Japanese Patent No. 3932613).

SUMMARY OF THE INVENTION

However, while the pivoting chain guide 620 and fixed chain guide 630 are held together in the known chain guide mechanism 600 mentioned above, the drive sprocket S1, driven sprockets S2 and S3, and chain C are not held together but only set in predetermined relative positions. Therefore the work efficiency during assembly or maintenance could be improved only slightly.

Another problem was that the arm member 611 integrally formed with the fixed chain guide 630 was provided only on one side of the chain C and extended as far as to the mounting boss 621 of the pivoting chain guide 620 so that the arm member 611 could easily deform in the thickness direction as shown in FIG. 10, which caused the fitting hole 612 and the mounting boss 621 of the pivoting chain guide 620 to readily separate from each other.

The present invention solves the problems encountered by conventional techniques as described above and it is an object of the invention to provide a chain guide mechanism that enables a plurality of chain guides, a chain, and a sprocket to be held together with a simple structure, such that work efficiency during assembly and maintenance is improved.

The present invention solves the problems noted above by providing a chain guide mechanism that includes a fixed chain guide that slidably guides a chain, a pivoting chain guide that slidably guides the chain, and a connection unit that connects the fixed chain guide and the pivoting chain guide, the pivoting chain guide including a mounting boss in a cylindrical shape, the connection unit being made up of arm members that extend from both sides of the chain on a chain running surface of the fixed chain guide toward the pivoting chain guide, and a coupling member including a fitting hole for the mounting boss of the pivoting chain guide to fit in. The coupling member includes connecting arms extending from both sides of the chain on a chain running surface of the pivoting chain guide toward the arm members. The connecting arms each include an engaging portion that can be engaged with and fixed to a locking portion of each of the arm members.

In the chain guide mechanism according to claim 1 of the present invention, the pivoting chain guide includes a mounting boss in a cylindrical shape, and the connection unit is made up of arm members that extend from both sides of the chain on a chain running surface of the fixed chain guide toward the pivoting chain guide, and a coupling member including a fitting hole for the mounting boss of the pivoting chain guide to fit in. The coupling member includes connecting arms extending from both sides of the chain on the chain running surface of the pivoting chain guide toward the arm members. Thus the fixed chain guide is held between a pair of arm members, and the pivoting chain guide is held between a pair of connecting arms. Therefore, separation of guide mounting holes and mounting bosses is prevented, and as the guides are reliably united, the work efficiency during assembly and maintenance can be improved.

The connecting arms each include an engaging portion that can be engaged with and fixed to a locking portion of each of the arm members. This facilitates connection and separation of the pivoting chain guide and the fixed chain guide, which makes it easier to unite them with the chain or sprocket, and thus the work efficiency during assembly and maintenance can be improved.

That the coupling member is formed separately as an independent component allows the coupling member to be of a material or have properties specifically selected to achieve ideal clearance setting in consideration of heat shrinkage, or to achieve ideal component strength or deformation resistance or the like when the pivoting chain guide rocks, without affecting the characteristics required for other constituent elements, and therefore the overall production cost can be reduced.

According to the configuration set forth in claim 2, the arm members each include a sprocket holding part that makes sliding contact with a sprocket. Thus the sprocket can reliably be integrated.

According to the configuration set forth in claim 3, the connecting arms are joined together by a fixing wall provided on an opposite side to the engaging portion across the fitting hole. The connecting arms are therefore in a U-shaped clip form and hardly open outward near the fitting hole, so that the pivoting chain guide is prevented from coming off.

According to the configuration set forth in claim 4, the locking portions of the arm members and the engaging portions of the connecting arms of the coupling member are formed such that the connecting arms engage with the arm members from inside of the arm members. Therefore, when the coupling member is engaged with the arm members, the connecting arms of the coupling member can hardly open, so that the mounting boss of the pivoting chain guide is prevented from coming off from the fitting hole.

According to the configuration set forth in claim 5, the arm members are formed integrally with a guide shoe that constitutes the chain running surface of the fixed chain guide. The connection unit and fixed chain guide can be united only by attaching the guide shoe of the fixed chain guide to a fixed guide support member, and thus the work efficiency during assembly and maintenance can be improved.

According to the configuration set forth in claim 6, the locking portion of each of the arm members includes a rocking movement slot for allowing the coupling member to rock around the fitting hole. Thus the pivoting chain guide and coupling member can be pivoted together after assembly. This allows the mounting boss of the pivoting chain guide to be secured to the fitting hole instead of being loosely fitted therewith. As the two components are firmly joined together, the work efficiency during assembly and maintenance can be improved.

DESCRIPTION OF THE PREFERRED EMBODIMENTS

Figure 1:
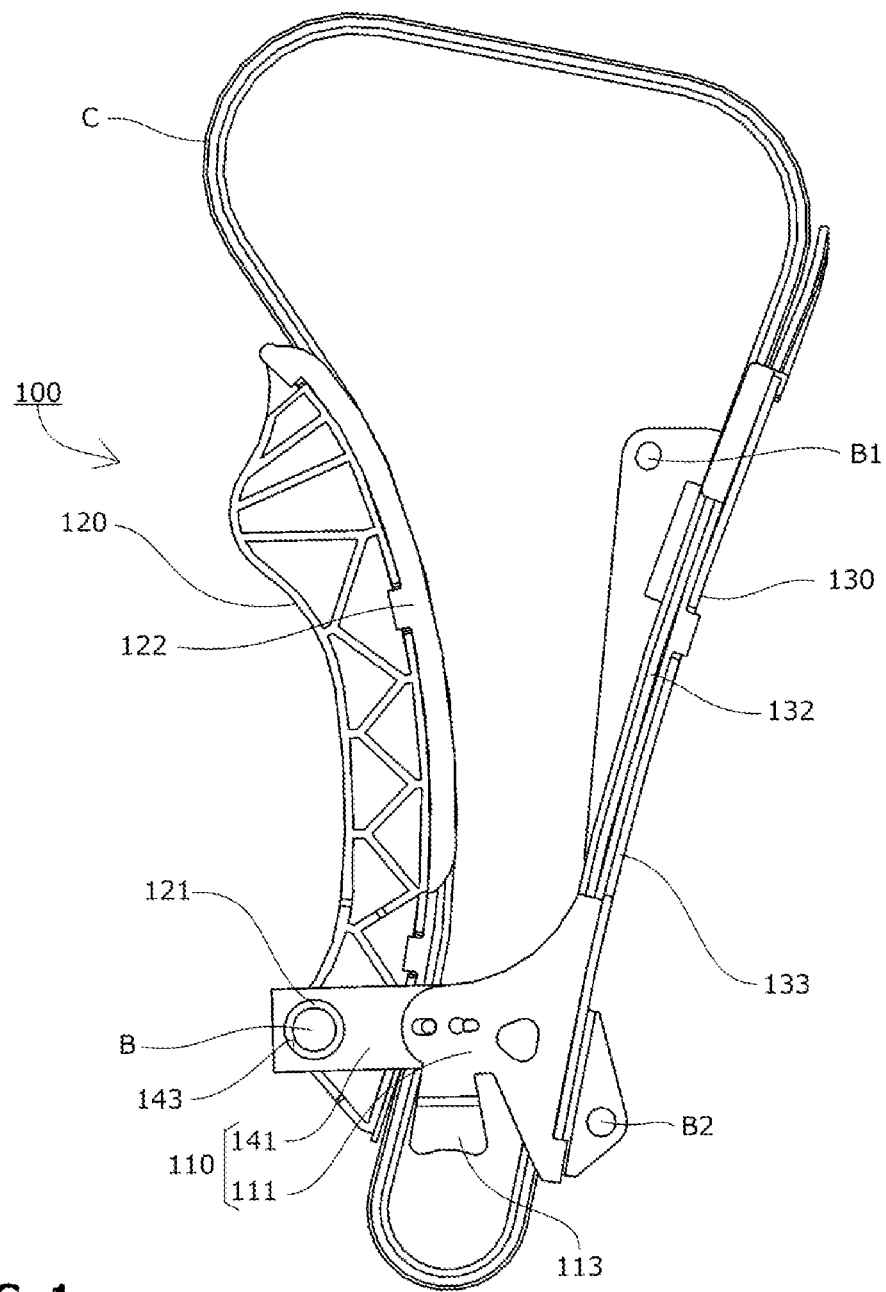
FIG. 1 is an overall illustrative diagram of one form of use of a chain guide mechanism according to a first embodiment of the present invention.

The chain guide mechanism of the present invention may be embodied in any form as long as it includes a fixed chain guide that slidably guides a chain, a pivoting chain guide that slidably guides the chain, and a connection unit that connects the fixed chain guide and the pivoting chain guide, the pivoting chain guide including a mounting boss in a cylindrical shape, the connection unit being made up of arm members that extend from both sides of the chain on a chain running surface of the fixed chain guide toward the pivoting chain guide, and a coupling member including a fitting hole for the mounting boss of the pivoting chain guide to fit in, the coupling member including connecting arms extending from both sides of the chain on a chain running surface of the pivoting chain guide toward the arm members, the connecting arms each including an engaging portion that can be engaged with and fixed to a locking portion of each of the arm members.

In the chain guide mechanism according to the present invention, the chain running surfaces of the fixed chain guide and pivoting chain guide may be integrally formed with the chain guides by molding from a material that has good sliding properties, or, a guide shoe having good sliding properties with the chain may be removably attached to the chain guides.

Any materials having low friction resistance with the chain can be used for the fixed chain guide, pivoting chain guide, and/or guide shoe for the chain guide mechanism according to the present invention. In particular, materials that exhibit durability in high temperature environments while enabling smooth running of the chain in sliding contact are suitable. Synthetic resin materials, for example, such as polyamide 6 resin, polyamide 46 resin, polyamide 66 resin, polyacetal resin, can be used preferably.

When the fixed chain guide and pivoting chain guide include a guide shoe, the part supporting the guide shoe may be made of metal such as iron or aluminum.

The arm members and coupling member that form the connection unit of the chain guide mechanism of the present invention may contact the chain and are used with the chain guides. Therefore, as with the chain guides, they should preferably be made of a material that has low friction resistance with the chain, exhibits durability in high temperature environments, and enables smooth running of the chain in sliding contact.

Embodiment 1

A chain guide mechanism 100 that is a first embodiment of the present invention includes, as shown in FIG. 1 to FIG. 4, a fixed chain guide 130 that slidably guides a chain C, a pivoting chain guide 120 that slidably guides the chain C, and a connection unit 110 that connects the fixed chain guide 130 and the pivoting chain guide 120.

The pivoting chain guide 120 includes cylindrical mounting bosses 121.

The connection unit 110 is made up of a pair of arm members 111 that extend from both sides of the chain C on the chain running surface of the fixed chain guide 130 toward the pivoting chain guide 120, and a coupling member 141 including fitting holes 143 for the mounting bosses 121 of the pivoting chain guide 120 to fit in.

The arm members 111 are integrally formed with a guide shoe 132 that forms the chain running surface of the fixed chain guide 130, and each include a sprocket holding part 113 that makes sliding contact with a sprocket (not shown).

The coupling member 141 includes a pair of connecting arms 142 extending from both sides of the chain C on the chain running surface of the pivoting chain guide 120 toward the arm members 111. The pair of connecting arms 142 are joined by a fixing wall 145 that is provided on the opposite side to an engaging portion across the fitting holes 143.

Namely, the coupling member 141 is in U-shape in top view.

As part of a locking portion to engage with the coupling member 141, the arm members 111 are each provided with two locking holes 114 on the side closer to the pivoting chain guide 120, and as part of an engaging portion, the connecting arms 142 of the coupling member 141 are each provided with engaging protrusions 144 at the distal end to be inserted into and engaged with the locking holes 114.

The engaging protrusions 144 on the pair of connecting arms 142 of the coupling member 141 protrude outward and away from each other so that they engage with the locking holes 114 from inside of the pair of arm members 111.

The process of attaching the chain guide mechanism 100 that is the first embodiment configured as described above to an engine room (not shown) will be explained.

Since the arm members 111 are integral with the guide shoe 132, when the guide shoe 132 is secured to a fixed guide support member 133, the fixed chain guide 130 and the arm members 111, which are one of the components of the connection unit 110, are joined.

The coupling member 141, which is the other component of the connection unit 110, is united with the pivoting chain guide 120 by fitting the mounting bosses 121 into the fitting holes 143.

The chain C and a lower sprocket (not shown) are then set, and the engaging protrusions 144 of the coupling member 141 are inserted into and engaged with the locking holes 114 of the arm members 111, so that the fixed chain guide 130, pivoting chain guide 120, chain C, and lower sprocket (not shown) can all be held together.

The fixed chain guide 130, pivoting chain guide 120, chain C, and lower sprocket (not shown) all held together are then inserted into the engine block. The mounting shaft B is fitted into the cylindrical mounting bosses 121 of the pivoting chain guide 120, while the mounting shafts B1 and B2 are passed through the fixed guide support member 133 of the fixed chain guide 130, whereby the chain guide mechanism 100 is secured inside the engine room.

Embodiment 2

The chain guide mechanism that is a second embodiment of the present invention is configured basically the same as that of the first embodiment described above apart from the designs of the mounting bosses 121 of the pivoting chain guide 120, fitting holes 143 of the coupling member 141, and locking portions of the arm members 111.

Figure 5:
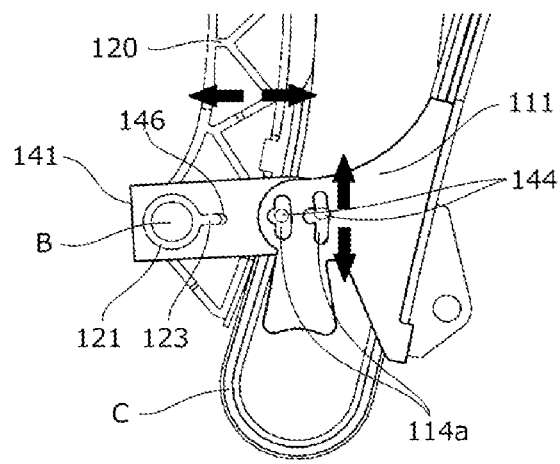
FIG. 5 is an illustrative diagram showing a chain guide mechanism that is a second embodiment of the present invention.

The mounting boss 121 of the pivoting chain guide 120 in the second embodiment includes an anti-rotation tab 123 extending radially outward as shown in FIG. 5 for fitting into an anti-rotation slot 146 provided on the radially outer side of the mounting boss 121 of the pivoting chain guide 120.

The locking holes 114 that form the locking portions of the arm members 111 are provided with rocking movement slots 114a for allowing the coupling member 141 to rock around the mounting shaft B that is the pivot center of the pivoting chain guide 120.

In the first embodiment, the mounting bosses 121 have to be loosely fitted into the fitting holes 143 so that the pivoting chain guide 120 can pivot not only around the mounting shaft B, but also around the fitting holes 143 of the coupling member 141. In this embodiment, the pivoting chain guide 120 and coupling member 141 can be pivoted together.

Since the mounting bosses 121 of the pivoting chain guide 120 can be secured to the fitting holes 143 instead of being loosely fitted therewith, the two components can be firmly joined together, so that the work efficiency during assembly and maintenance can be improved.

Figure 6:
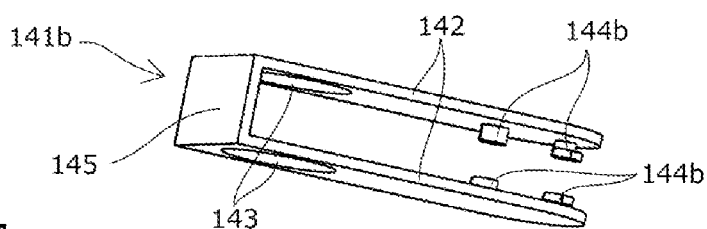
FIG. 6 is a perspective view of a coupling member in another embodiment of the present invention.
Figure 7:
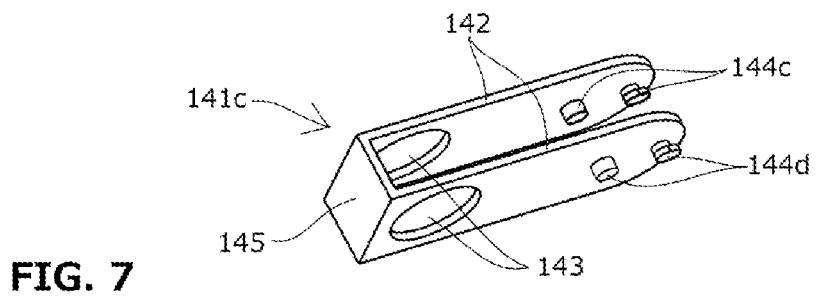
FIG. 7 is a perspective view of a coupling member in yet another embodiment of the present invention.
Figure 8:
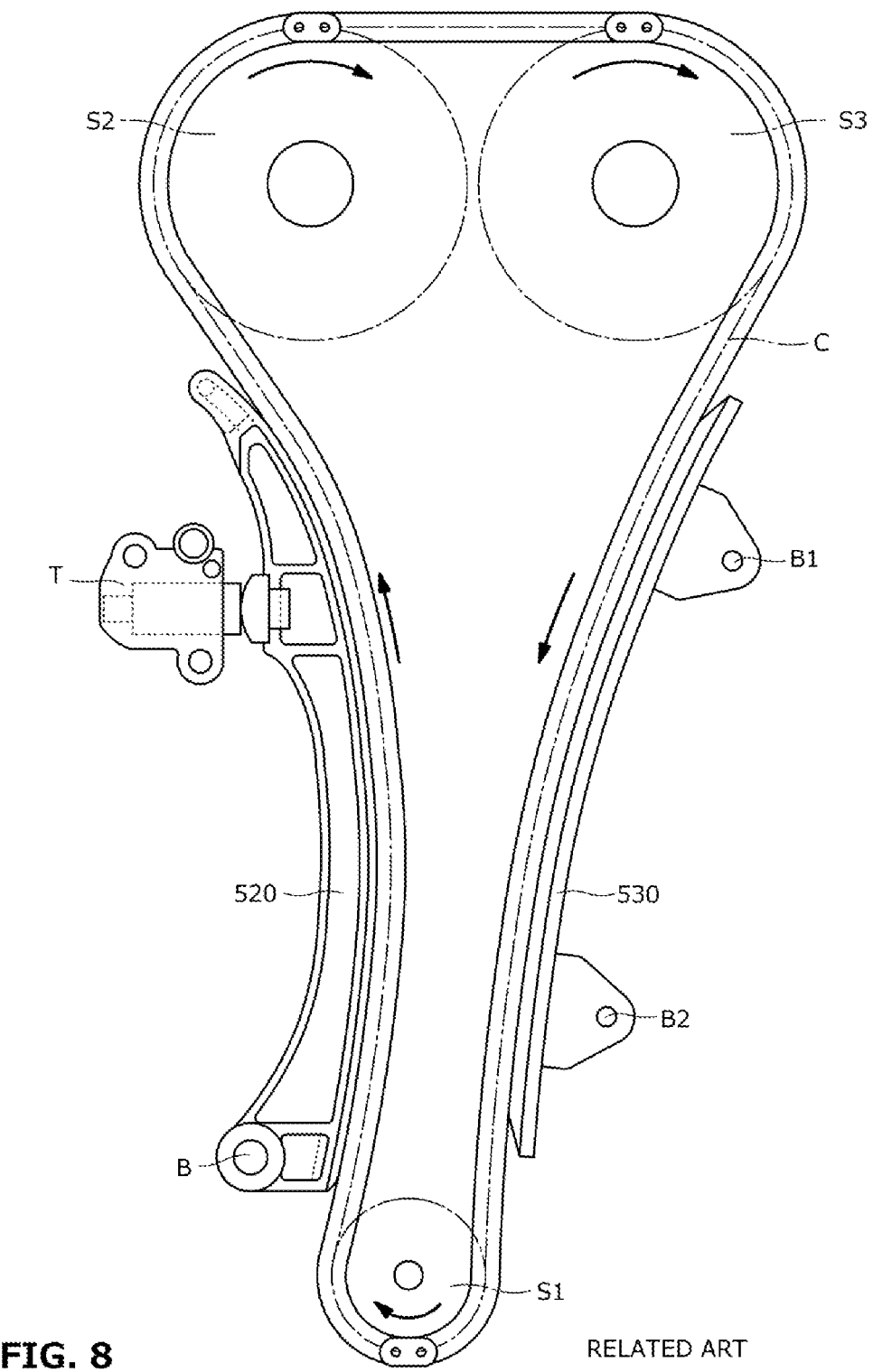
FIG. 8 is an illustrative diagram of a known chain guide mechanism.
Figure 9:
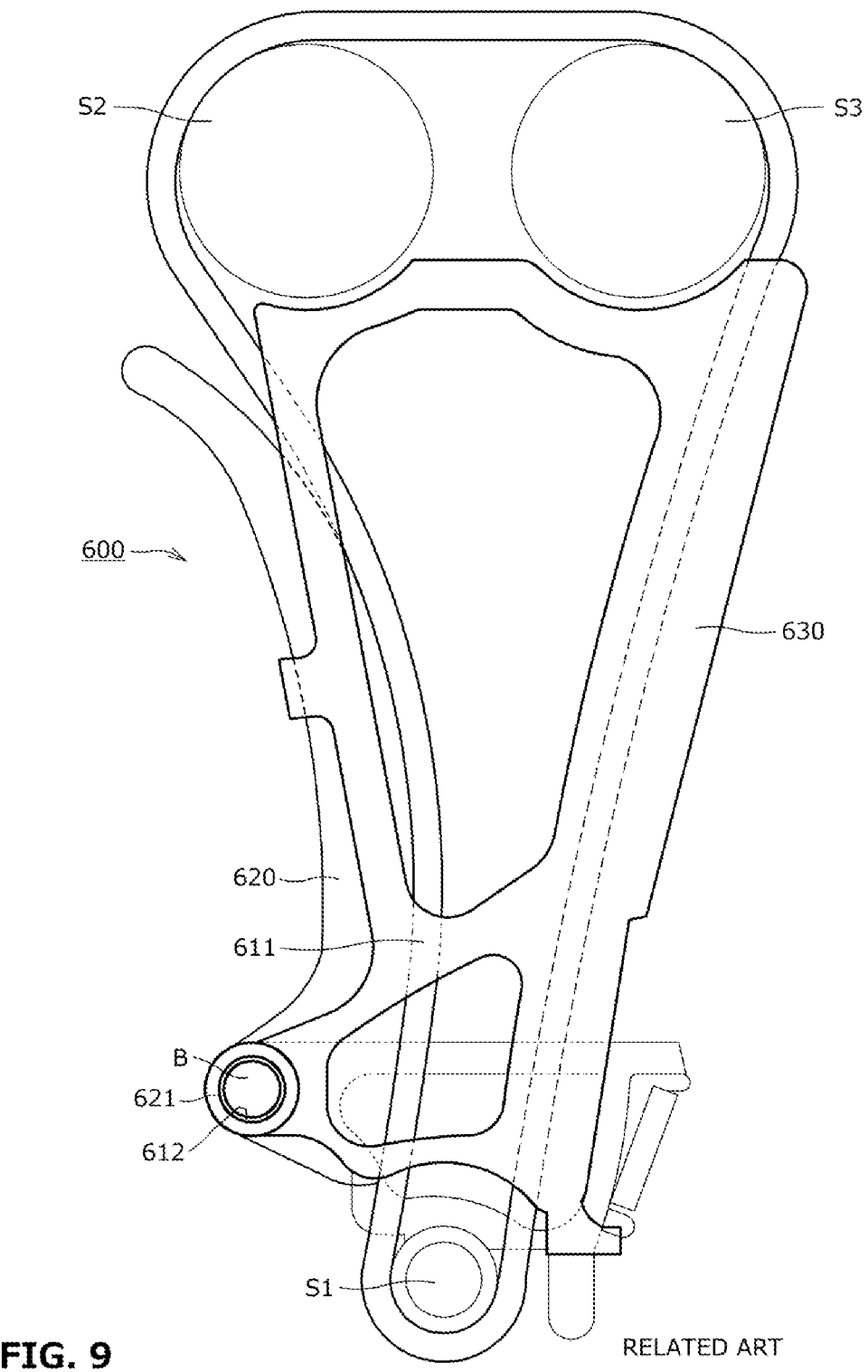
FIG. 9 is an illustrative diagram of another known chain guide mechanism.
Figure 10:
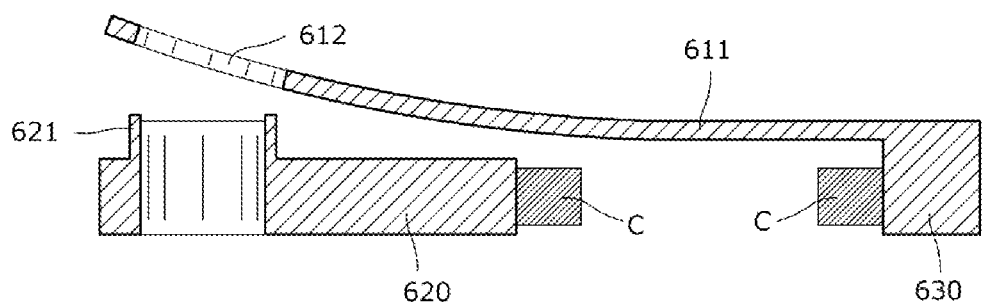
FIG. 10 is a cross-sectional illustrative diagram of FIG. 9.

The engaging protrusions 144 on the pair of connecting arms 142 of the coupling member 141 are provided such as to protrude outward and away from each other. Instead, as shown in FIG. 6, engaging protrusions 144b may be provided such as to protrude toward each other from inside of the pair of connecting arms 142 of the coupling member 141b for engaging with the locking holes 114 of the pair of arm members 111 from outside. Alternatively, as shown in FIG. 7, one of the connecting arms 142 may include engaging protrusions 144c protruding inward while the other connecting arm 142 may include engaging protrusions 144d protruding outward, for engaging with the locking holes 114 of the pair of arm members 111 from one side.

The arm members 111 are formed integrally with the guide shoe 132 that constitutes the chain running surface of the fixed chain guide 130 in the embodiments described above. Instead, the arm members 111 may be formed integrally with the fixed guide support member 133, or, the arm members 111 may be formed separately from the fixed chain guide 130 and designed securable to the fixed chain guide 130 by some other means.

Figure 2:
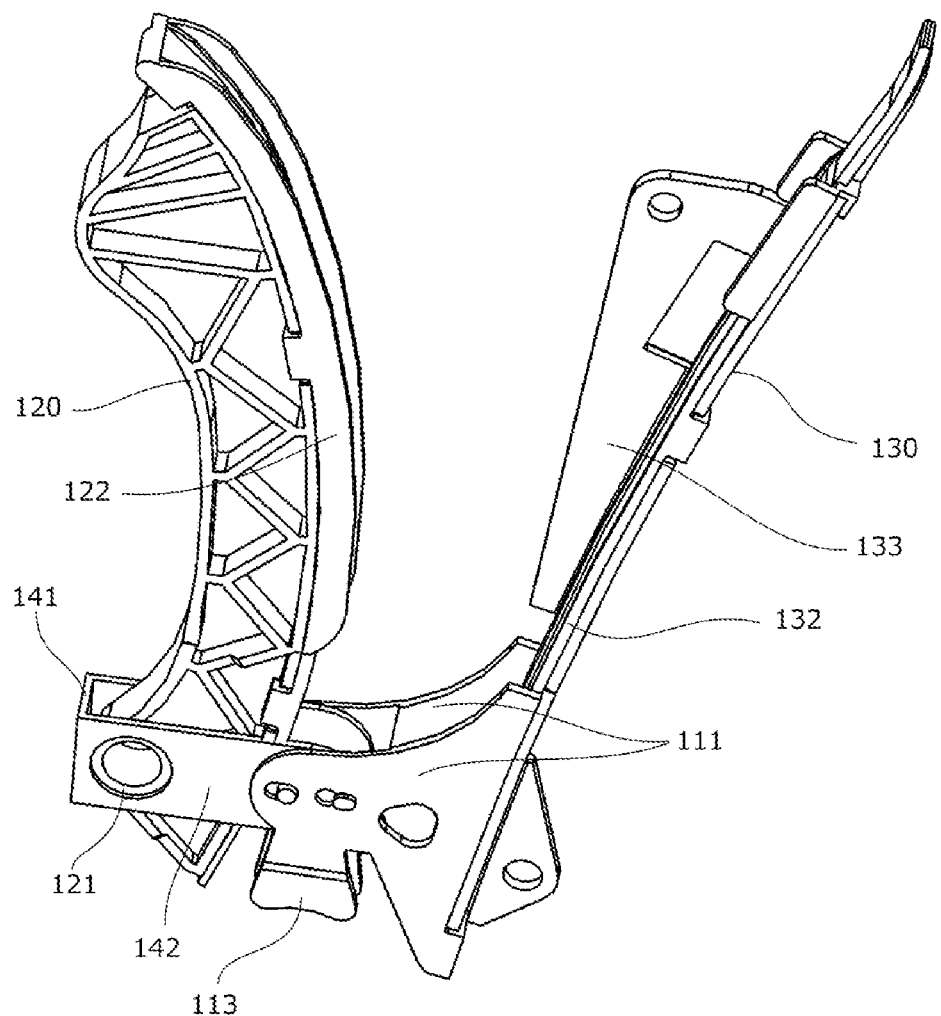
FIG. 2 is a perspective view of the chain guide mechanism that is the first embodiment of the present invention.
Figure 3:
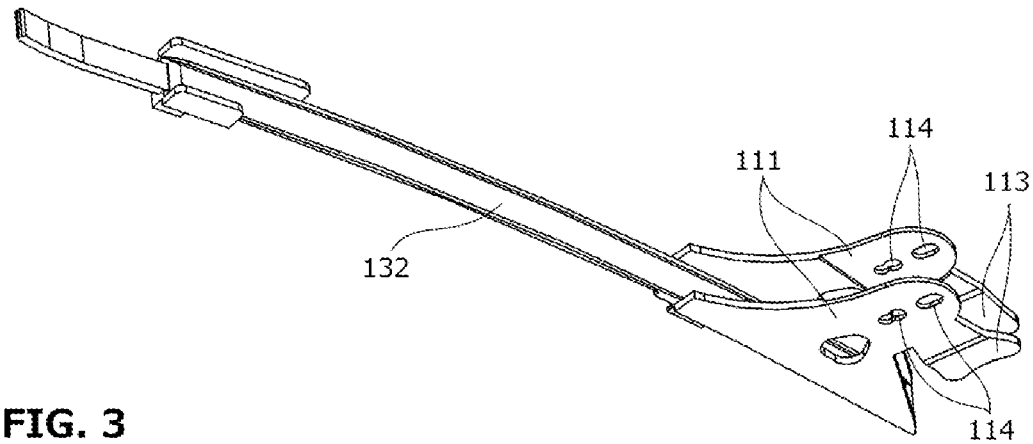
FIG. 3 is a perspective view of arm members integral with a guide shoe.
Figure 4:
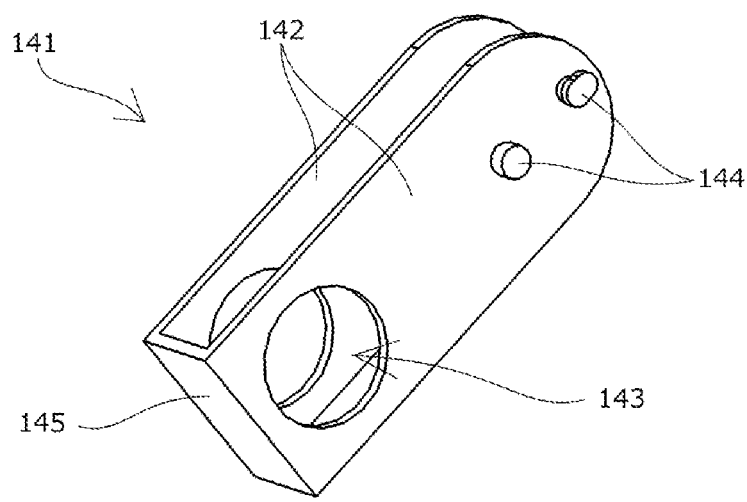
FIG. 4 is a perspective view of a coupling member.

While the guide shoe 122, which constitutes the chain running surface, is provided separately to the pivoting chain guide 120 in the embodiment shown in FIG. 1 and FIG. 2, the pivoting chain guide 120 may include the guide shoe 122 as one integrally formed part thereof.

The invention claimed is:

1. A chain guide mechanism comprising:
   a fixed chain guide that slidably guides a chain;
   a pivoting chain guide that slidably guides the chain; and
   a connection unit that connects the fixed chain guide and the pivoting chain guide,
   the pivoting chain guide including a mounting boss in a cylindrical shape,
   the connection unit being made up of arm members that extend from both sides of the chain on a chain running surface of the fixed chain guide toward the pivoting chain guide, and a coupling member including a fitting hole for the mounting boss of the pivoting chain guide to fit in,
   the coupling member including connecting arms extending from both sides of the chain on a chain running surface of the pivoting chain guide toward the arm members,
   the connecting arms each including an engaging portion that can be engaged with and fixed to a locking portion of each of the arm members.

2. The chain guide mechanism according to claim 1, wherein the arm members each include a sprocket holding part that makes sliding contact with a sprocket.

3. The chain guide mechanism according to claim 1, wherein the connecting arms are joined together by a fixing wall provided on an opposite side to the engaging portion across the fitting hole.

4. The chain guide mechanism according to claim 1, wherein the locking portions of the arm members and the engaging portions of the connecting arms of the coupling member are formed such that the connecting arms engage with the arm members from inside of the arm members.

5. The chain guide mechanism according to claim 1, wherein the arm members are formed integrally with a guide shoe that constitutes the chain running surface of the fixed chain guide.

6. The chain guide mechanism according to claim 1, wherein the locking portion of each of the arm members includes a rocking movement slot for allowing the coupling member to rock around the fitting hole.

* * * * *